C. E. PIATT.
CANE STRIPPING MACHINE.
APPLICATION FILED NOV. 17, 1911. RENEWED SEPT. 17, 1917.

1,265,244.

Patented May 7, 1918.
4 SHEETS—SHEET 1.

Witnesses:
Leonard W. Novander.
Robert F. Brache.

Inventor
Charles E. Piatt
By Owen & Williams
Attorneys

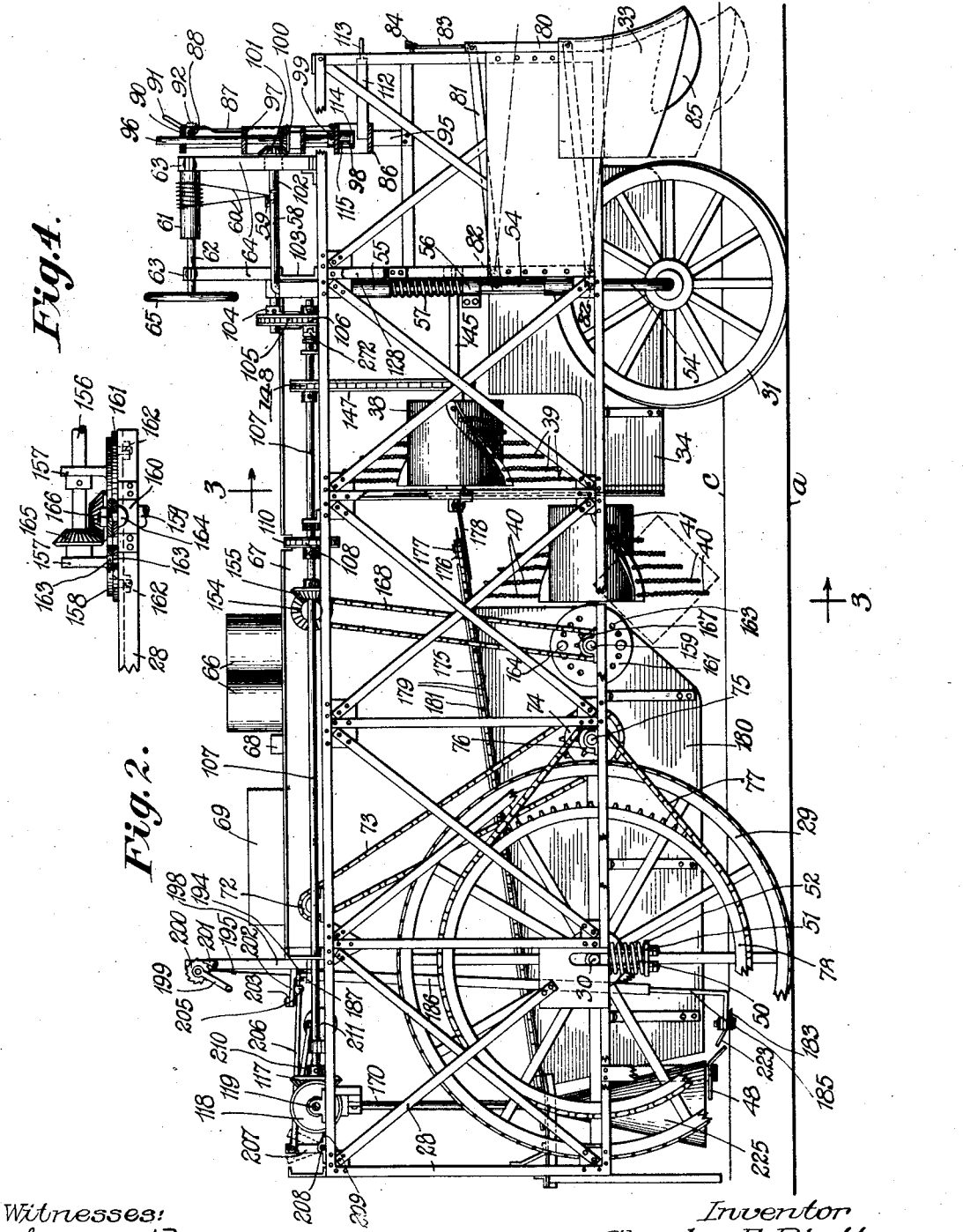

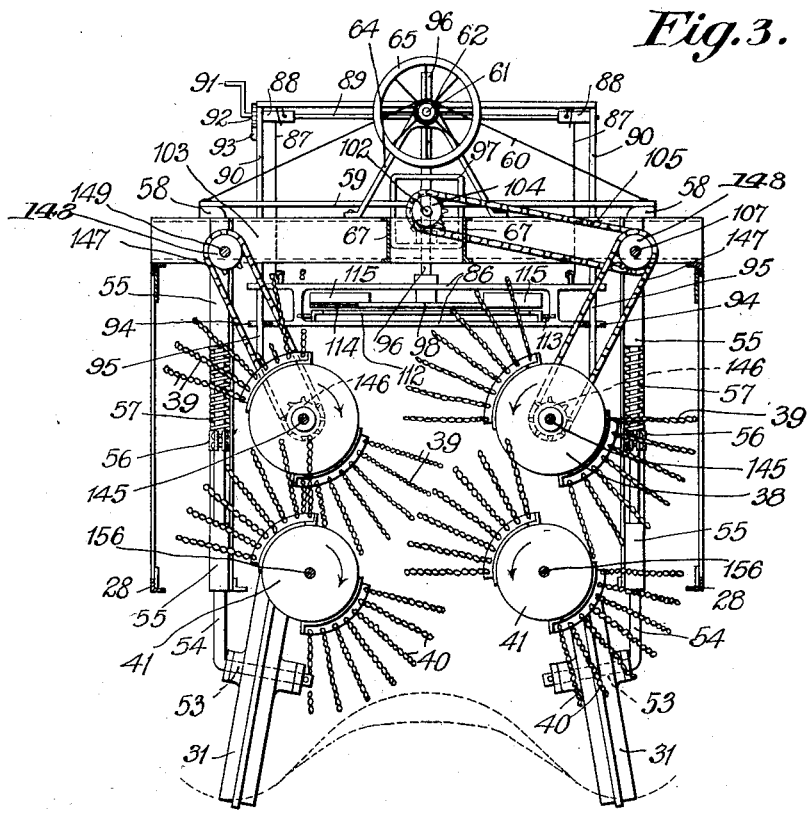

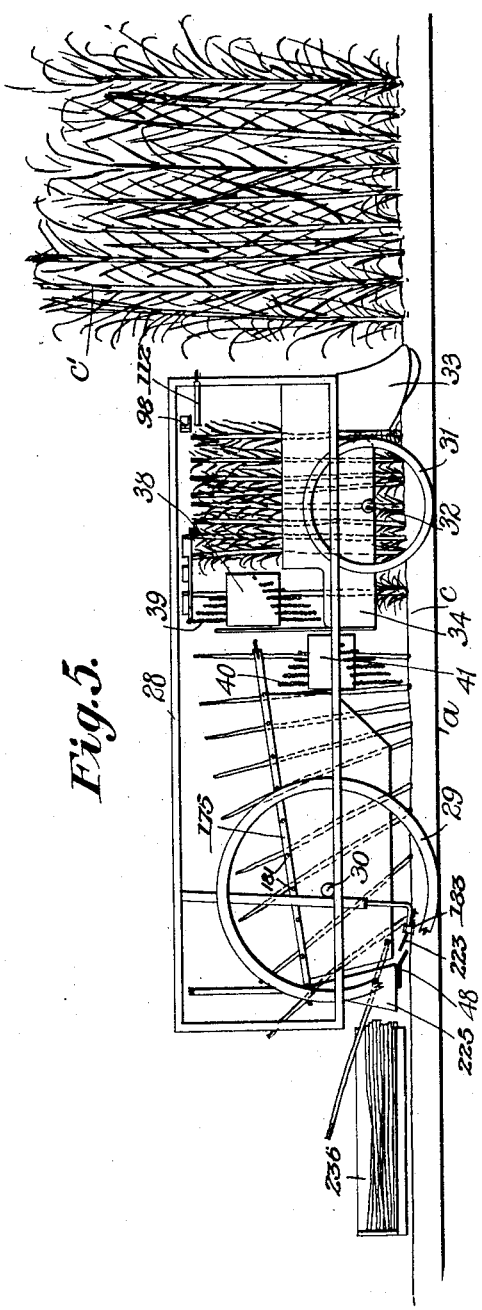

UNITED STATES PATENT OFFICE.

CHARLES E. PIATT, OF BERKELEY, CALIFORNIA, ASSIGNOR TO CHARLES A. BROWN, HARVEY L. HANSON, AND ARTHUR H. BOETTCHER, COPARTNERS DOING BUSINESS UNDER THE FIRM-NAME OF BROWN, HANSON & BOETTCHER, OF CHICAGO, ILLINOIS.

CANE-STRIPPING MACHINE.

1,265,244.

Specification of Letters Patent.

Patented May 7, 1918.

Application filed November 17, 1911, Serial No. 660,758. Renewed September 17, 1917. Serial No. 191,902.

*To all whom it may concern:*

Be it known that I, CHARLES E. PIATT, a citizen of the United States, residing at Berkeley, in the county of Alameda and State of California, have invented certain new and useful Improvements in Cane-Stripping Machines, of which the following is a full, clear, concise, and exact description, reference being had to the accompanying drawings, forming a part of this specification.

My invention relates to the art of cane stripping machines and is particularly concerned with sugar cane. It is well-known to those skilled in the art that sugar cane is of various types and that certain types are confined more or less strictly to one kind of soil and climate, while other types are confined more or less strictly to other kinds of soil and climate. There have been few attempts to harvest sugar cane by the use of automatic machinery; first, because it is not likely that the machine would be applicable to all kinds of cane and, second, because the various treatments to which the cane must be subjected in harvesting require a quite complicated series of manipulations.

The types of sugar cane which grow in Hawaii and Cuba are quite different from the types which grow in Australia and the United States, the cane growing sections in this country being particularly in Louisiana and Texas. I make these introductory statements in order that I may point out to those skilled in the art that the machine herein disclosed is especially adapted for use on the type of cane now generally grown in Louisiana and Texas. I do not mean to confine the use of the machine to any particular type of cane, wherever it be grown, but I contemplate its employment in connection with whatever kind of cane it proves adaptable for. I make these general statements merely so that those skilled in the art may appreciate what problems are to be solved, what conditions are to be met, and what difficulties are to be overcome.

Generally speaking, and considering the physical growth, there are two types of cane. There are the types commonly known as 74 D and 95 D, which are sturdy straight-upstanding canes and which retain their structural upright positions, even in strong winds. On the other hand, there is the type known as purple cane, in some instances called striped cane, which has a much less vigorous constitution than the 74 D and 95 D cane and which, therefore, is very likely to submit to strong winds and then to lie more or less prostrate on the ground. It will thus be seen that the problem may be to harvest either a field of straight upstanding cane or a field of cane which is lying on the ground, or at least leans toward the ground and is therefore more or less in the condition of a jungle.

The stripping operation is taken care of by means of a series of chains which are swung about one or more axes and which, due to centrifugal force, extend almost radially therefrom. These flexible members whip the cane and effectively remove the tops from the shorter canes and strip all the cane of its foliage. It is these devices which remove that which is valuable from that which is not valuable by reason of their respective constituencies. This chain construction which I employ, and which I specifically make the subject-matter of some of my claims hereto appended, is such that it will not harm the valuable portion of the cane but will destroy the valueless portion thereof. In other words, this destructive effect comes between the two constituencies, as pointed out.

Because the zone of operation, during the stripping treatment, is a comparatively large one for that kind of a treatment, I divide that operation so that the upper zone is so treated at one section of the machine, while the other zone is treated at a section slightly behind it.

I shall now proceed to a detailed description of a machine embodying features of my invention, and in doing this I shall refer to the accompanying drawings, in which—

Fig. 2 is a side elevational view of the machine, parts being removed to avoid complication;

Fig. 3 is a cross-sectional view taken on the plane of the line 3—3 of Fig. 2 and looking in the direction indicated by the arrows;

Fig. 4 is an isolated view illustrating the manner of mounting certain of the chain carriers;

Fig. 5 is an elevational view of the attachment which is to be employed in treating the prostrate cane;

Fig. 6 is a plan view of the mechanism of Fig. 5.

Like reference characters are applied to the same parts throughout the various figures.

Figure 1:
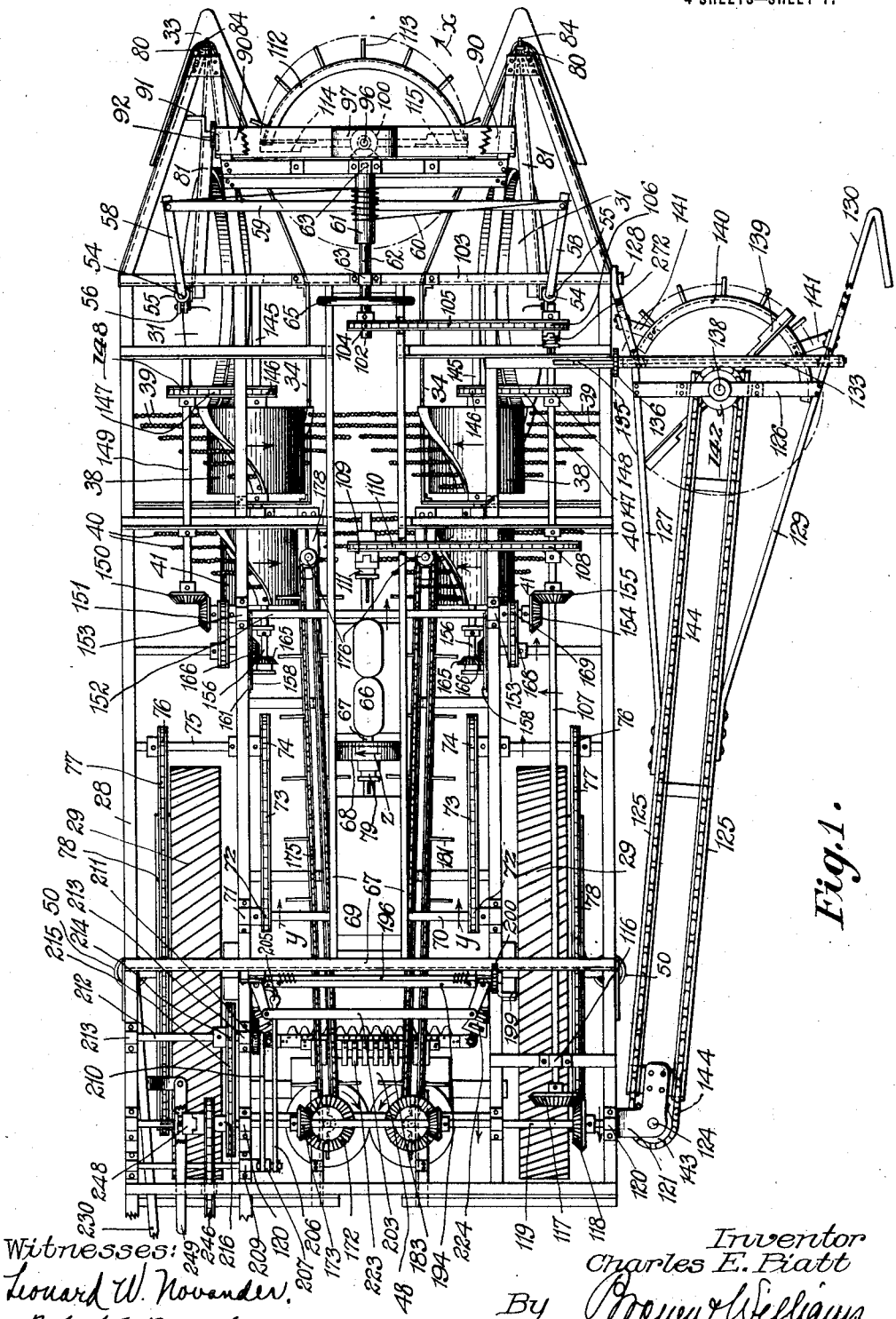
Figure 1 is a substantially complete plan view of the machine of my invention, parts being broken away to clearly reveal the structure.

The framework of the machine is illustrated at 28 and it will be seen that it is carried upon the traction wheels 29, whose axle is illustrated at 30, and the steering wheels 31, whose axle is illustrated at 32. The traction wheels and the steering wheels are set approximately in longitudinal line with the prows 33, 33, so it will appear that the wheels run in the furrows. The forward portion of the central passageway, which is formed by the two side elements of the frame, is lined in its lower part by means of the sheeting 34, 34. At the restricted part of the central passageway, the drums 38, 38 which revolve on longitudinal axes, are disposed. These drums are provided with chains 39, 39 which are attached thereto in spiral order and which extend approximately radially therefrom when the drums are revolved. It will be seen that these chains extend into the passageway and, operating in transverse planes, whip the cane which is caught in the passageway and strip the foliage therefrom. The chains 39, however, reach only the upper part of the cane which remains standing, and this action is therefore supplemented by the action of similar chains 40, 40 which are attached in spiral order to the drums 41, 41, which in turn revolve upon axes lying in substantially the same vertical longitudinal planes with the drums 38, 38 but in a considerably lower plane, as illustrated in Figs. 1 and 2. The chains 40, 40 also extend into the central passageway, as in the case of the chains 39, 39, and in this way the lower portions of the standing stalks are stripped of their foliage.

The chains 39 and 40 are short as compared with the diameters of the drums to which they are attached. This is so for the reason that when the drums are revolved the chains will not wrap themselves about the drums and thereby become ineffective.

It will be seen that the framework 28 comprises a thoroughly braced mechanically resistant structure. At the rear end, the framework rests upon compression springs 50 which surround U-shaped hangers 51, which in turn carry adjustable bearing plates 52 upon which the springs rest. In this way, an adjustable spring suspension is provided for the rear end of the vehicle. The traction wheels 29 are braced apart at such a distance that they may run in the furrows of the cane field. The manner in which traction is secured will be described presently.

Each of the front wheels of the vehicle is mounted upon an inwardly turned part 53 of a supporting rod 54 which extends upwardly and is mounted for vertical movement in the bearing sleeves 55, 55 secured near the front of the framework 28. The sleeves 55 for each rod are spaced apart a considerable distance and between them the rod 54 is provided with a collar 56. Between this collar 56 and the upper sleeve 55 a compression spring 57 is provided and since the collar may be set in any desired position, an adjustable spring suspension is thus provided for the front end of the vehicle. The parts 53, 53 are at an oblique angle to the rods 54, 54, so that the wheels 31, 31, will lean inwardly as illustrated in Fig. 3, so that a compact arrangement is secured. At the top, each of the rods 54 is provided with a forwardly extending crank arm 58, and the ends of these crank arms are linked together by means of a bar 59. A cable 60 has one end attached to the end of one of the crank arms 58, is wound about a drum 61, and has its other end attached to the end of the other crank arm. The drum 61 is mounted rigidly upon a shaft 62 set in bearings 63, 63 carried by uprights 64, 64 at the front of the framework. The shaft 62 has the hand wheel 65 secured thereto and it will now be clear that when this hand wheel is turned, the drum 61 acts as a capstan to turn the steering wheels 31, 31 in one direction or the other. The springs 57, 57 are, of course, very stout springs and there will not be much compression at these points. In other words, the relative movement between the framework and the rods 54, 54 will be slight and will be such as can easily be compensated for by a slight turn of the wheel 65.

The power plant comprises an engine 66 which is suitably mounted in cross channels 67, 67 set upon the top of the framework 28. The engine shaft 67' carries a fly wheel 68 and normally is adapted to rotate in the direction of the arrow z. The engine shaft leads into a gear box 69 which contains the transmission. This transmission may be of any well known type and it is therefore not shown in detail. Suffice it to say that the gear train terminates in the jack shaft 70, which is disposed transversely of the machine and which is adapted to rotate normally in the direction of the arrows y, y. The jack shaft 70 is mounted in bearings 71, 71 carried on the top of the framework 28 and is provided with two sprocket wheels 72, 72 which, by means of sprocket chains 73, 73 are connected with sprockets 74, 74 on counter-shafts 75, 75 mounted in suitable bearings in the frame work substantially on a line with the horizontal plane of the axles of the traction wheels. Each of the counter-shafts 75 carries another sprocket 76 which, by means of a sprocket chain 77, is connected with a large sprocket wheel 78 secured upon the outside of the associated traction wheel 29. Thus, the speed ratio is such that ample power for traction purposes is secured. A clutch 79 controls the operative connection between the engine and the traction system.

The prows 33, 33, which supplement the pointed forward ends of the side elements of the frame, are carried upon vertical links 80 which have pivoted thereto swinging bars 81, 81 mounted at 82, 82, upon the frame work. The prows 33 are adapted to occupy two positions. In one position they are drawn up away from the ground and are held in such position by means of hangers 83, and hooks 84 on the framework 28, and in the other position they are dropped down as indicated in dotted lines in Fig. 2. The under side of the sides of the prows are provided with wooden blocks 85, 85 which are adapted to ride upon the ground. The prows may be disposed in either position depending upon the particular requirements of the cane being harvested.

As before stated, I provide upon my machine two "toppers," one over the row of cane over which the machine is passing, and the other over the adjoining row of cane. The former I refer to as the "middle topper" and the latter I call the "side topper." Referring first to the middle topper, it will be seen that at the forward end of the central passageway of the machine, near the top thereof, I provide a four-sided frame 86 which is carried by means of a pair of cables 87, 87 wound upon drums 88, 88, and which in turn are set upon a shaft 89 mounted in suitable bearings in a supplementary frame-piece 90 extending upwardly from the top of the framework 28. The shaft 89 is provided at its outer end with a crank 91 and is also provided with a ratchet wheel 92 which is engaged by a pawl 93. This holds the frame 86 in any adjusted position and it will be apparent that it provides for the raising and lowering of the frame. The frame is guided in this movement by means of its bifurcated ends 94, 94 which engage with vertical straps 95, 95 suitably secured in the framework. A shaft 96 is mounted in a bearing on the upper limb of the frame 86 and extends upwardly therefrom through a box 97 set in the framework. The shaft is rotatable in the walls of this box and also in the upper wall of the frame piece 90. The shaft 96 extends down into the frame 86 and is there provided with a rotating cutter 98 in the form of a double arm. The attachment of this rotatable cutter and the use of a collar 99 determines the position of the shaft 96 relative to the box 86 and it will be clear that as the frame 86 is raised and lowered, the shaft 96 will rise and fall with it. Inside the box 97 a bevel pinion 100 is suspended upon the shaft 96 so that, regardless of the vertical position of the shaft, the pinion will always retain the same position. This pinion meshes with the bevel gear 101 which is mounted upon a shaft 102 set in suitable bearings on the top of cross channels 103. At its rear end this shaft 102 is provided with a sprocket 104 which, by means of a chain 105, is connected with a sprocket 106 secured upon a jack shaft 107 which extends longitudinally almost the entire length of the machine. This jack shaft is connected with the engine shaft 67 by means of sprockets 108 and 109, sprocket chain 110, and clutch 111. It will thus be seen that, through this chain of parts, the rotary motion of the engine shaft is transmitted to the knife or cutter 98. A semi-circular supporting member 112, which I call a comb, is mounted on the frame 86 to coöperate with the cutter 98. This supporting member has the peripheral prongs 113 and the cane is adapted to be caught between and supported against these prongs so that they may be held properly for the action of the knife. It will be seen that the knife or cutter 98 is provided with its cutting edges 114, 114 at its ends and that the supporting comb is disposed in the path of these cutting edges. The cutter operates in the direction of the arrow $x$ and in back of each of the cutting edges an upright plate 115 is provided and these plates are effective in throwing the several tops to one side. It is clear that manipulation of the crank 91 will secure the vertical adjustment of the cutter and in this way the cane may be topped in each instance as its nature requires.

As before pointed out, the forward end of the central passageway of the machine is lined by a metallic sheeting 34, and the cane, after being topped, enters this passageway for further treatment. The first treatment that it receives at this point is the whipping treatment which has been described, and the first part of this treatment is secured by chains, 39, 39 which extend from the drums 38, 38. Each of these drums is mounted upon a shaft 145, extending longitudinally of the machine and mounted in suitable bearings in the framework. Each of these shafts is provided with a sprocket wheel 146 which, by means of a sprocket chain 147, is connected with a sprocket wheel 148. In one instance this sprocket is secured directly upon the jack shaft 107, and in the other instance it is secured upon an auxiliary shaft 149, parallel to the jack shaft but on the other side of the machine. This auxiliary shaft is provided with a miter gear 150 at its rear end and this miter gear meshes with a corresponding gear 151 which is secured upon a shaft 152 extending transversely of the machine and mounted in suitable bearings 153, 153. The other end of this transverse shaft is provided with a bevel gear 154 which meshes with a gear 155 on the jack shaft 107 and in this way the motion of the jack shaft is imparted to the auxiliary shaft and the drum on the other side of the machine. It will be seen that the drums 38, 38 are rotated toward each other transversely and that the chains extending therefrom whip through the central passageway, the metallic sheeting 34 being properly cut out to permit of this action and turned back to house the drums. The chains are in sets and overlap, being timed to alternate.

The drums 38, 38, which have just been described, treat the upper parts of the cane. In order to treat the lower parts of the cane, the drums 41, 41 are provided, these drums having the chains 40, 40 as described before, operating in a lower zone than the other sets of chains. The drums 41, 41 are each carried upon a shaft 156 which is mounted in the manner illustrated in detail in Figs. 2 and 4. It will be seen that only one end of this shaft has a bearing and this bearing is in the form of two separate bearing parts 157, 157, which are spaced apart sufficiently to obtain the effect of a considerable bearing surface, and which extends laterally from a plate 158 which is mounted loosely upon a shaft 159 set in a bearing 160 on a part of the framework 28. Associated with this plate 158 is another plate 161 which is secured to the framework rigidly by means of bolts 162, 162. The two plates or disks, are thus disposed face to face and they are each provided with a series of openings 163, 163 which are all on the same radius, and which are thus adapted to aline in the particular combination. Thus the shaft 156 may be set at any angle and, once set, may be held in such adjusted position by means of bolts 164, 164. By means of this arrangement, the drums 41, 41 may be brought down at an angle even to the extent shown in dotted lines in Fig. 2 whenever the condition of the field finds it desirable. Very often the lower part of the cane leans considerably while the upper part tends to stand upright and with these adjustable drums, the chains may be made to operate in planes substantially parallel to the lines of the stalks at that point, as is quite necessary if the proper stripping action is to be secured. In order to impart rotary motion to the drums, each of the shafts 156 is provided with a beveled pinion 165 which meshes with a corresponding gear 166 secured upon the shaft 159. Also secured upon this shaft 159 is a sprocket wheel 167 which, by means of a chain 168, is operatively connected with the sprocket 169 secured upon the cross-shaft 152 which has already been referred to as operatively connected with the engine shaft, the gears 154 and 155, jack shaft 107, and sprocket chain 110.

As pointed out in the introductory part of this specification, it frequently occurs in the cases of purple or striped cane, that the cane lies so low that the topping devices which have been described will not be effective. In order that my machine may be adapted to the treatment of this kind of cane, however, I provide a drum 267 which is mounted to rotate upon a transverse axis at the front of the central passageway. This drum is keyed upon a cross-shaft 268, at the proper height, as shown in Fig. 5, and it is provided with a series of chains 269 arranged in the same manner as pointed out in connection with the chain structures heretofore described. The shaft 268 is provided with a sprocket wheel 269' which, by means of a sprocket chain 270, is connected with a sprocket 271 mounted upon the shaft 152 which has already been described as operatively connected with the jack shaft 107. A chain drum like this will whip off the tops of the cane even though they are lying more or less prostrate and the entire topping action may be taken care of in this way. In order to bring the more or less prostrate cane into proper position for such whipping and to hold it there, I provide the comb structures 270, 270, which are supported from the framework 28 and which have teeth 271, 271 extending downwardly and obliquely, as illustrated in the drawings. The machine is run in a direction so that these combs will be oblique in the same respect that the more or less prostrate cane is.

The remainder of the treatment in this special instance is carried out in the same manner heretofore described. It is very likely that the upper drums would be unnecessary since they would be too high for any advantageous operation in addition to the operation of the transverse drum, and it is possible that the transverse drum may do all the work of stripping. However, the lower drums may be brought into play to finish the stripping action and, since they are adjustable as described, they may be brought into the most advantageous position.

I claim as new and desire to secure by Letters Patent:

1. In a cane stripping machine, a frame, large rotating drums carried by said frame, and spirally arranged chains of comparatively short length hung upon said drums.

2. In a cane stripping machine, a frame, a plurality of large rotating drums mounted on said frame, and spirally arranged chains of comparatively short length hung upon said drums, said drums being arranged in different horizontal planes.

3. In a cane stripping machine, a frame having a central passageway, a large rotating drum mounted on each side of said frame, and comparatively short chains depending from said drums and arranged to swing in said passageway.

4. In a cane stripping machine, a frame, large rotating drums mounted on said frame, and spirally arranged flexible whippers of comparatively short length hung upon said drums.

5. In a cane stripping machine, a frame having a central passageway, a large rotating drum mounted on each side of said frame, and spirally arranged comparatively short flexible whippers.

6. In a cane stripping machine, a frame, a large rotating drum carried by said frame, the axis of said drum being adjustable in a vertical plane, and comparatively short chains hung from said drum.

7. In a cane stripping machine, a frame, a rotating drum carried by said frame, the axis of said drum being pivoted for adjustment in a vertical plane, and comparatively short chains hung from said drum.

8. In a cane stripping machine, a frame, a circular plate carried on said frame, a second plate placed face to face with said first named plate and rotatably mounted for adjustment relative thereto, means for holding said movable plate in any adjusted position, bearing lugs on said movable plate, a shaft mounted in said lugs, a drum on said shaft, means for rotating said shaft, and whipping chains carried by said drum.

9. In a cane stripping machine, a frame, two drums rotating on longitudinal axes on said frame, two drums mounted on swinging axes on said frame, and whipping chains carried by each of said drums.

10. In a cane stripping machine, a frame, two drums rotating on longitudinal axes on said frame, two drums mounted on swinging axes on said frame, and whipping chains carried by each of said drums, said last named drums being in a different horizontal zone than said first named drums.

11. In a cane stripping machine, a frame, a rotatable drum carried on said frame, a metallic strip secured in spiral position on said drum, and chains hung from said strip.

12. In a cane stripping machine, a frame having a longitudinal central passageway, metallic sheeting lining said passageway, and cane stripping devices carried by the side elements, said lining being cut out to permit the stripping devices to operate in the passageway.

13. In a cane stripping machine, a frame having a longitudinal central passageway, metallic sheeting lining said passageway, and cane stripping devices carried by the side elements, said lining being cut out to permit the stripping devices to operate in the passageway, and said lining being turned back to house said stripping devices.

14. In a cane stripping machine, a frame having a central passageway, a rotatable drum mounted on each side of the frame on an axis parallel to the passageway, and chains arranged in sets on said drums and operating in said passageway, the stroke of the chains on one drum overlapping that of the others, said drums being relatively timed to alternate the action of the sets.

15. In a cane harvester, a frame, a plurality of large rotating drums mounted on said frame, and spirally arranged chains of comparatively short length hung upon said drums, said drums being arranged in different but overlapping horizontal planes.

In witness whereof, I hereunto subscribe my name this 18th day of October, A. D. 1911.

CHARLES E. PIATT.

Witnesses:
ARTHUR H. BOETTCHER,
ALBERT G. MCCALEB.

Copies of this patent may be obtained for five cents each, by addressing the "Commissioner of Patents, Washington, D. C."